US011856324B2

(12) United States Patent
Choi

(10) Patent No.: US 11,856,324 B2
(45) Date of Patent: Dec. 26, 2023

(54) VIRTUAL FACE TO FACE TABLE DEVICE

(71) Applicant: Hae-Yong Choi, Seoul (KR)

(72) Inventor: Hae-Yong Choi, Seoul (KR)

( * ) Notice: Subject to any disclaimer, the term of this patent is extended or adjusted under 35 U.S.C. 154(b) by 0 days.

(21) Appl. No.: 18/087,966

(22) Filed: Dec. 23, 2022

(65) Prior Publication Data
US 2023/0224434 A1 Jul. 13, 2023

(30) Foreign Application Priority Data

Jan. 11, 2022 (KR) .......................... 10-2022-0004264

(51) Int. Cl.
*H04N 7/15* (2006.01)
*H04N 7/14* (2006.01)

(52) U.S. Cl.
CPC .................. *H04N 7/144* (2013.01)

(58) Field of Classification Search
CPC ........ A45D 44/005; G02B 5/32; G02B 30/56; H04M 3/56; H04N 1/3212; H04N 5/2222; H04N 7/142; H04N 7/144; H04N 13/144; H04N 23/61; H04N 1/32128; H04N 7/15; H10K 50/818; A47C 31/123; G06F 3/011
See application file for complete search history.

(56) References Cited

U.S. PATENT DOCUMENTS

| | | | | |
|---|---|---|---|---|
| 5,025,314 A * | 6/1991 | Tang | .......................... | H04N 7/15 434/350 |
| 5,572,248 A * | 11/1996 | Allen | ...................... | H04M 3/56 348/E7.083 |
| 5,675,376 A * | 10/1997 | Andersson | ............. | H04N 7/142 348/E7.079 |
| 7,054,668 B2 * | 5/2006 | Endo | .................... | A45D 44/005 455/566 |
| 9,270,933 B1 * | 2/2016 | Jiang | ....................... | H04N 23/61 |
| 9,313,452 B2 * | 4/2016 | Friel | ....................... | H04N 7/144 |
| 10,582,154 B2 * | 3/2020 | Kimura | .................... | G02B 5/32 |
| 2003/0197779 A1 * | 10/2003 | Zhang | .................... | H04N 7/144 348/14.09 |
| 2004/0100567 A1 * | 5/2004 | Miller | ................. | H04N 1/32128 348/E5.047 |
| 2004/0117067 A1 * | 6/2004 | Jouppi | .................... | G06F 3/011 700/259 |
| 2007/0002130 A1 * | 1/2007 | Hartkop | ............... | H04N 13/144 348/E7.078 |
| 2008/0278516 A1 * | 11/2008 | Santon | ................... | H04N 7/144 345/619 |
| 2010/0005588 A1 * | 1/2010 | Christopher | ......... | A47C 31/123 5/423 |
| 2013/0162749 A1 * | 6/2013 | Eskilsson | ............... | H04N 7/144 348/14.1 |

(Continued)

*Primary Examiner* — Gerald Gauthier
(74) *Attorney, Agent, or Firm* — BACON & THOMAS, PLLC

(57) ABSTRACT

The present invention implements a device that displays a counterpart video with an actual size within a table structure and a table size, configures a video system in a structure of matching an eye of a counterpart like a reality, and configures upper, lower, left, and right sides of a mutual face-to-face video to match each other without a separate video inversion device, and enables a dialogue to be made in real time, and relates to a virtual face-to-face table device which is configured within a table height and may be used like a table.

1 Claim, 3 Drawing Sheets

(56) References Cited

U.S. PATENT DOCUMENTS

| | | | | |
|---|---|---|---|---|
| 2013/0314782 | A1* | 11/2013 | White | G02B 30/56 |
| | | | | 359/479 |
| 2017/0264865 | A1* | 9/2017 | Huangfu | H10K 50/818 |
| 2021/0041946 | A1* | 2/2021 | De Backer | H04N 5/2222 |
| 2023/0224434 | A1* | 7/2023 | Choi | H04N 7/144 |
| | | | | 348/14.16 |

* cited by examiner

VIRTUAL FACE TO FACE TABLE DEVICE

CROSS-REFERENCE TO RELATED APPLICATION

This application claims under 35 U.S.C. § 119(a) the benefit of Korean Patent Application No. 10-2022-0004264 filed on Jan. 11, 2022, the entire contents of which are incorporated herein by reference.

BACKGROUND

TECHNICAL FIELD

The present invention relates to a virtual face-to-face table device in which a table and a camera device, a video monitor device, and a reflection and transmission device are combined as one system to virtually face a counterpart positioned at a remote distance without a separate video inversion device structure as if confronting face-to-face.

BACKGROUND ART

Due to the corona-19, etc., as mutual visits are controlled and a social distance should be separated due to the quarantine rules, and a mask should be used in spite of a first facing person, face-to-face opportunities such as visiting exchanges and exhibitions are significantly reduced.

When there is need to have a meal with acquaintances at a remote distance or perform a consultation with a trading line, it is necessary to confront face to face.

When a doctor and a patient perform an untact medical diagnosis and consultation, the doctor needs to visit far away from hospital to check the patient's condition.

In this case, the doctor should move long distance by a vehicle, and a movement time is required longer than a consultation time.

Further, since the mask should be used upon an interview due to the quarantine rules, it is difficult to perform a procedure for checking a face of a counterpart and there is inconvenience that the mask should be worn even in a face-to-face interview.

Since conventional remote video conferences are mainly conducted through a small screen of approximately 14", such as a notebook computer, a sense of reality as well as a sense of realism, persuasive power and a sense of intimacy is significantly small.

Related arts such as Korean Patent Application No. 10-2007-0021592, 10-2007-0021590, 10-2007-0018426, and 10-2019-0036966 cannot be used as a structure in which a video device is combined with a table or a structure of confronting face to face while contacting eyes of the counterpart, and are not also a structure capable of performing real-time conversation.

Therefore, there is need for a device that allows people at a remote distance to virtually face to face as if they are confronting face to face at a field table without going to a field.

[Prior Art Documents]
[Patent Documents]
(Patent Document 1) Korean Patent Application No. 10-2007-0021592
(Patent Document 2) Korean Patent Application No. 10-2007-0021590 (Patent Document 2) Korean Patent Application No. 10-2007-0018426
(Patent Document 2) Korean Patent Application No. 10-2019-0036966

SUMMARY OF THE DISCLOSURE

An object of the present invention is to provide a table device, which is expressed with the same size as real table at an opposite side to the table across the table of a counterpart to have a sense of space and a sense of reality as if a distant interlocutor is actually confronting the counterpart face to face in front of the table, thereby achieving a face-to-face effect through a real-time conversation.

The present invention implements a device that displays a counterpart video with an actual size within a table structure and a table size, configures a video system in a structure of matching an eye of a counterpart like a reality, and configures upper, lower, left, and right sides of a mutual face-to-face video to match each other without a separate video inversion device, and enables a dialogue to be made in real time, which is configured within a table height and may be used like a table.

In order to implement such a feature, the present invention includes a table configured on a front surface of a case, and a video monitor which implements a video of the counterpart with a real thing size, but is provided in a rear end of an interior of the case, and includes a first reflector provided on a front surface of the video monitor in a square at an upward reflection angle in order to implement the video of the counterpart with a sense of space and a semi-transmissive reflector provided above the first reflector in a parallel square to the first reflector in order to reflect at a reflection angle facing a user direction, and a camera, a microphone, and a speaker provided in the rear of the semi-transmissive reflector.

Such configuration is configured to include a video and sound communication device such as the wireless Internet, and upper, lower, left, and right sides of the videos of the video monitor an the camera are erected similarly, and an eye height of a user, a location of the camera, a center of the semi-transmissive reflector, the center of the first reflector, and the center of the video monitor are provided on one optical axial line to match the eye of the counterpart, so the video of the counterpart gives a face-to-face effect such as setting on a table face to face.

Any one of a chroma-key background such as a black background, a green background, etc., or a white board, and a video device is further provided on a user rear surface to give the sense of space and the semi-transmissive reflector is replaced with the second reflector which fully reflects, but the camera is provided between the second reflector and the user.

When the present invention is more clearly described with reference to drawings, the present invention includes a case 1 associated with a table 2 and including a video device in a rear of the table 2, a video monitor 5 provided at a rear end of an interior of the case 1 and displaying a video of a counterpart 12 facing virtually with a real thing size, a first reflector 6 provided on a front surface of the video monitor 5 in a square at a reflection angle to reflect upward, a semi-transmissive reflector 3 provided above the case 1 in a square to reflect downward so that upper, lower, left, and right sides of the video of the counterpart 12 are displayed in a right standing image and displayed in a space realistically, but provided in a square parallel to the first reflector 6, and a camera 7 provided in the rear of the semi-transmissive reflector 3, and an eye height of the user 11 and the location of the camera 7, the center of the semi-transmissive reflector 3, the center of the first reflector 6, and the center of the video monitor 5 are provided on one same optical axis A line in order to match the eye of the counterpart 12.

As another feature, any one of a chroma-key background such as a black background, a green background, etc., or a white board, and a video device is further provided on the rear surface of the user 11.

The camera 7 is configured to be provided between the semi-transmissive reflector 3 and the user 11.

As described above, according to the present invention, a first reflector and a semi-transmissive reflector are configured as a parallel square and counterpart videos are expressed in a space which an oblique side to a bottom side has to show a spatial three-dimensional effect as if there is a real thing, a size of a video monitor is configured as a minimum of 20 to 60" to display a counterpart video with the same size as the reality, an eye height of a user, and a camera, and centers of the first reflector and the semi-transmissive reflector, and the center of the video monitor are provided on one same optical axial line to continuously match the eye of the counterpart, the semi-transmissive reflector is configured by a full-reflection reflector to increase the brightness of the video monitor twice, the video monitor is configured in a front direction at a rear end of a body case, and the semi-transmissive reflector is configured on a front surface to reflect in the front direction, and the camera is provided at the central axis of the semi-transmissive reflector, and as a result, there is an effect that upper, lower, left, and right sides of the camera and the upper, lower, left, and right sides of the video camera match each other without a separate electronic video inversion device, and the structure of the video monitor is configured below a table height and configured to match the eye of the counterpart to confront face to face at various places such as a restaurant, business consultation, virtual interview, etc.

DETAILED DESCRIPTION

Hereinafter, preferred embodiments of the present invention will be described in detail with reference to the accompanying drawings.

The present invention is configured as below in order to achieve a unique object.

Figure 1A:
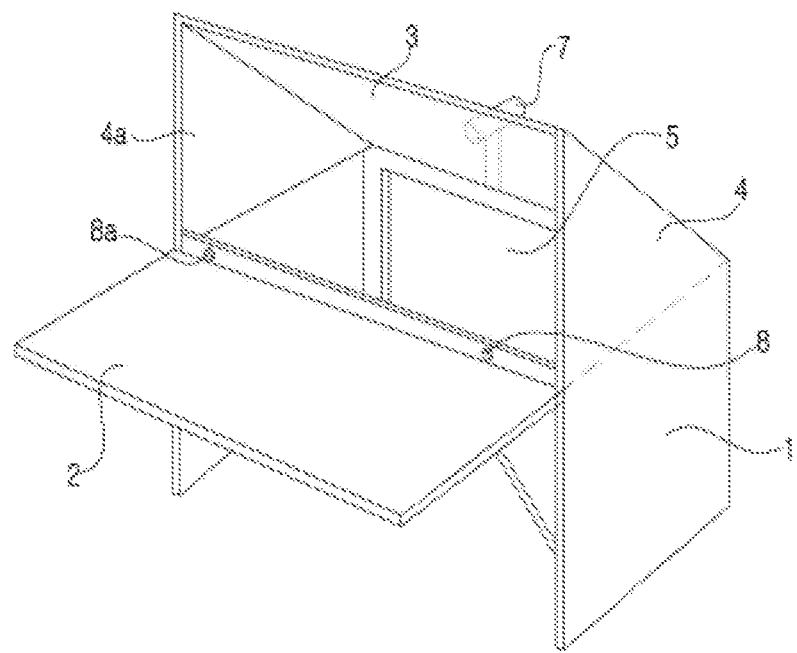
FIG. 1A is a perspective view of an exemplary embodiment of the present invention.
Figure 1B:
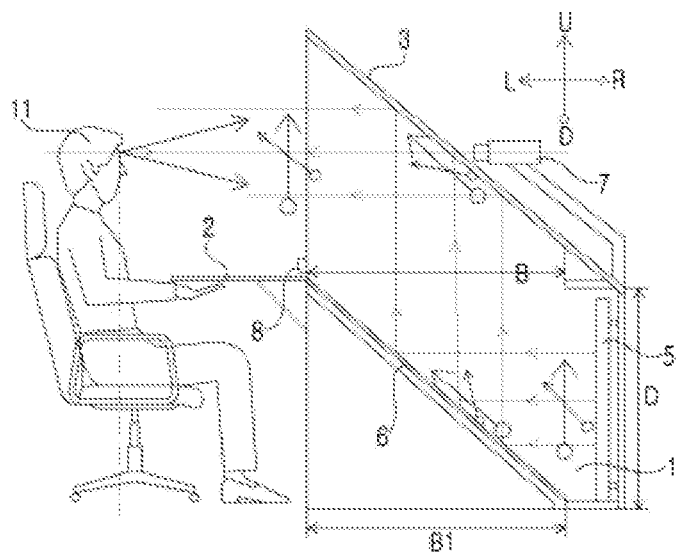
FIG. 1B is a side view.

FIGS. 1A and 1B are diagrams schematically illustrating a configuration diagram according to the present invention. A case 1 configures an entire lower part, a table 2 is provided in front of the case 1, and a video monitor 5 is provided in the rear of an interior of the case 1 so that a screen faces a front direction.

A first reflector 6 that fully reflects to reflect upward is provided on a front surface of the video monitor 5, and a semi-transmissive reflector 3 is configured in a parallel square with the first reflector 6 above the first reflector 6.

A camera 7 is provided at a rear end portion of the semi-transmissive reflector 3, and left and right partitions 4 and 4a are configured at left and right sides of the semi-transmissive reflector 3 by plastic made of a transparent material or a blocking film made of an opaque material.

The first reflector 6 is a reflector structure that fully reflects, and in the structure of the semi-transmissive reflector 3, a reflective surface is configured on the surface and is configured to have a function of transmitting a video on a rear surface based on a 45° square. The reflective ratio and the transmissive ratio are set according to a usage within 80:20 or 20:80 based on 50:50.

In the configuration of FIG. 1B, the video of the video monitor 5 is fully reflected and reflected upward in the first reflector 6 provided in a front direction, and refracted and reflected in a user direction on a reflection surface of the semi-transmissive reflector 3 provided above the first reflector 6 and reflected to a user 11.

The camera 7 provided on a rear surface of the semi-transmissive reflector 3 photographs an upper body of the user which straightly transmits the semi-transmissive reflector 3, i.e., an upper body shown above the table 2.

Figure 2A:
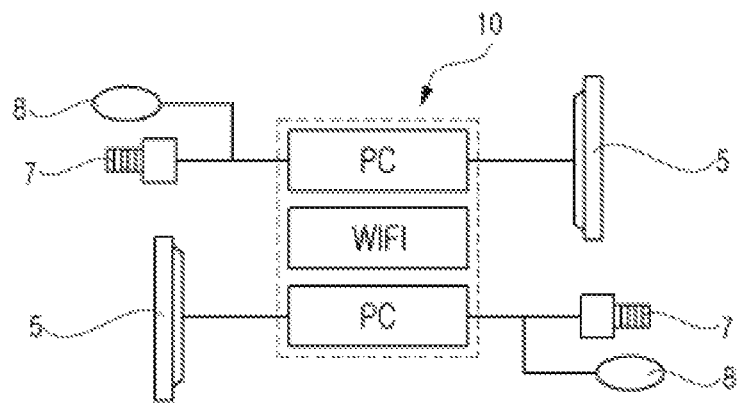
FIG. 2A is an explanatory diagram of an action of the present invention.
Figure 2B:
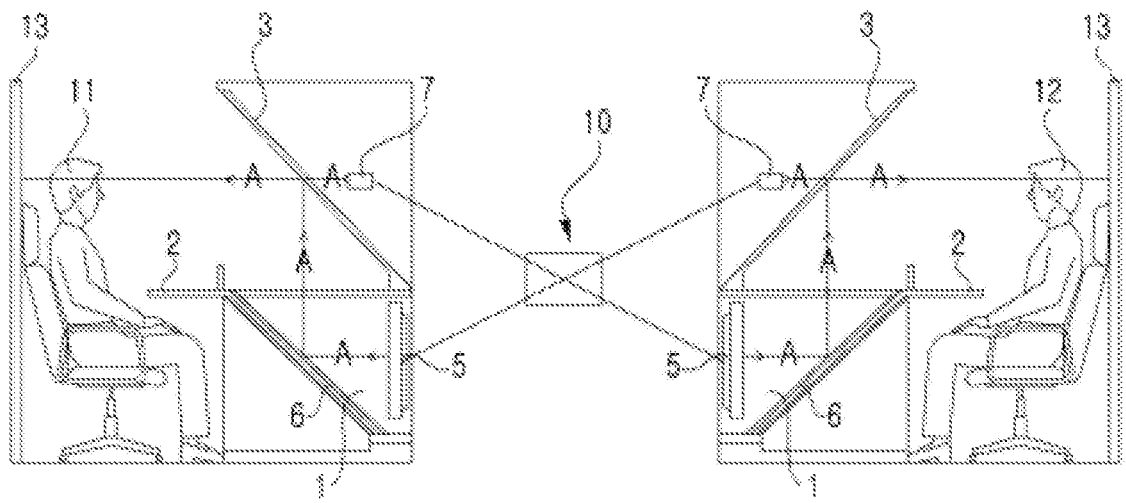
FIG. 2B is an explanatory diagram of a configuration of the present invention.

As illustrated FIGS. 2A and 2B, the video of the user 11 photographed by the camera 7 is displayed on the video monitor 5 of a counterpart 12 through a video and sound communication device 10 such as WiFi, and the video of the counterpart 12 photographed by the camera 7 is displayed on the video monitor 5 of the user 11 through the video and sound communication device 10.

Upper, lower, left and right videos of the video monitor 5 are displayed in a standing image, and reflected upward in the first reflector 6, and refracted and reflected on the surface of the semi-transmissive reflector 3 again, so the user observes the standing image as it is. Upper, lower, left, and right sides of such a video become simultaneously the standing image similarly to the vide of the user 11 transmitted to the camera 7.

That is, as described above, the video monitor 5 is provided at a lower rear end of the case 1, and the first reflector 6 is provided in front of the case 1 to reflect upward, and in the structure of the semi-transmissive reflector 3 provided above the first reflector 6 in a parallel square to fully omnidirectionally and the structure of the camera 7 provided on the rear surface of the semi-transmissive reflector 3 which the video straightly 20 transmits, the video of the video monitor 5 and the video of the camera 7 are transmitted in the same standing image up, down, left, and right, and viewed.

Further, as illustrated in FIG. 2B, the eye height of the user 11, the center of the semi-transmissive reflector 3, the location of the camera 7, the center of the first reflector 6, and the center of the video monitor 5 are configured on the same optical axial line as one optical axis A.

A reason for configuring as the same optical axis A is that the eye of the user 11 viewing the camera 7 and the eye of the counterpart 12 to which the video of the counterpart 12 is provided matches, a face-to-face effect may be obtained.

Therefore, in the present invention, the table 2 is provided on the front surface, the case 1 is provided on the rear surface of the table 2, the video monitor 5 is provided at the rear end of the case 1, the first reflector 6 that fully reflects in an upward square to reflect upward is provided on the front surface of the video monitor 5, the semi-transmissive reflector 3 is provided above the first reflector 6 in a forward square to reflect omnidirectionally in the direction of the user 11, and the camera 7 is provided on the rear surface of the semi-transmissive reflector 3 matching the eye height of the user 11.

Figure 3A:
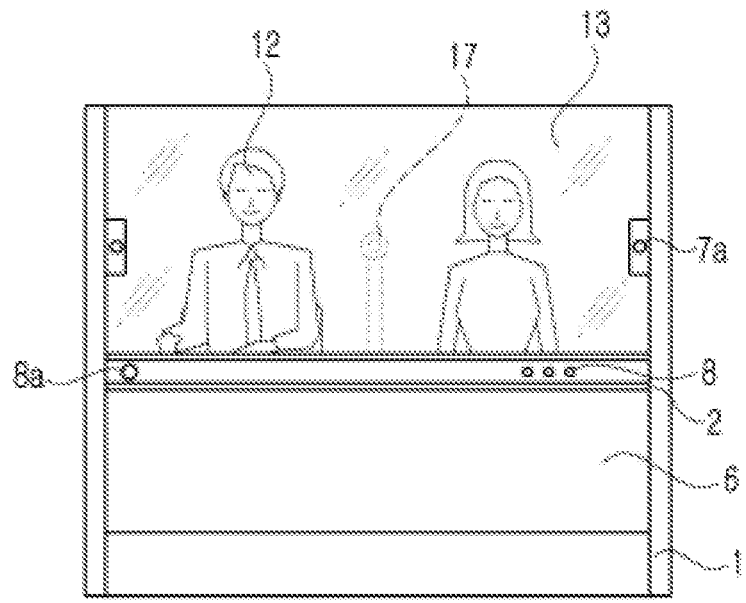
FIG. 3A is an explanatory diagram of an exemplary embodiment of the present invention.

The remaining part of the video 7 of the camera of each of the user 11 and the counterpart 12 other than the user 11 and the counterpart 12 is processed by chroma-key processing or a black screen by a black blocking film 13 which is a background of each of the user 11 and the counterpart 12 as illustrated in FIG. 3A and only the video of each of the user 11 and the counterpart 12 is transmitted.

That is, as illustrated in FIG. 3A, the blocking film 13 provided with a black or green color is provided in the rear of the user 11 or the counterpart 12 to set a periphery of the video of the user 11 or the counterpart 12 to a color without brightness.

Since the periphery of the counterpart 12 is processed by the black screen and has no brightness, an external foreground is transmitted, and as a result, a space virtual reality as if the counterpart being actually present in the field is obtained.

Further, the blocking film 13 is replaced with a white board and a video display to be utilized for meeting or education as necessary.

As illustrated in FIG. 3A, the size of the video monitor 5 should be set in order to display the counterpart with an actual size like an actual thing across the table.

In general, the height of the table is approximately 70 to 80 cm from the bottom. A sitting key of a person is 120 to 140 cm. Therefore, a height of an actual video size of the counterpart shown above the table becomes 40 to 70 cm.

A shoulder width of an adult is 35 to 50 cm. Therefore, with respect to an upper body size of a person of the counterpart displayed across the table, a horizontal length should be 35 cm or more and a vertical length should be less than 80 cm by considering a standard height of the table.

When such a point is considered, the video monitor 5 applied to the present invention corresponds to 20 to 65" based on a screen diagonal line and this becomes a 10 screen which is three times to 20 times larger than an existing notebook computer screen of 12 to 14".

Therefore, since the present invention should be installed at a height D which the interior of the case 1 limited to the height of the table 2 has as illustrated in FIG. 1B, the size of the video monitor 5 used in the present invention becomes less than 65" based on a screen ratio 16:9.

When the present invention is used for multiple persons, for example, the present invention may be configured for two persons, and when the present invention is implemented as four persons including the video of the counterpart 12, plural devices may be installed and used by a scheme of configuring two at left and right sides. A screen having a screen ratio of 16:9 may also be erected and used to a screen ratio of 9:16. In this case, a 20" video monitor 5 may be replaced, and erected and used. The video monitor may adopt a video device by self luminance, such as LCD, LED, etc. Therefore, the video monitor 5 applied to the present invention is not limited, but application of up to 20 to 65" is recommended.

The face-to-face video is displayed on the semi-transmissive reflector 3 and implemented like an actual video in the space.

The reason for configuring the first reflector 6 which fully reflects in the 45° square and configuring the semi-transmissive reflector 3 in a parallel 45° square again as illustrated in FIG. 1B is that a 3 D effect is generated as a space sense effect is generated as large as the bottom side c in which the semi-transmissive reflector 3 and the full-reflective first reflector 6 are configured in the square.

In general, a video which is implemented by a plane above the plane does not show the 3 D effect. Therefore, the square of the semi-transmissive reflector 3 and the square of the first reflector 6 are configured as the parallel squares as illustrated in FIG. 1B, and as a result, in the video, the space 3 D effect is formed as large as a space of the bottom sides B and B1 configured by the square to provide a space reality sense as if the counterpart 12 is present in front.

Further, as illustrated in FIGS. 2B and 3A, the video of the counterpart 12 displayed opposite to the table 2 incurs the sense of space as large as the space which the bottom sides B and B1 have as large as a square oblique side constituted by the structure of the semi-transmissive reflector 3 provided as a forward square and the structure of the first reflector 6 provided as an upward square as illustrated in FIG. 1B, and as a result, the video of the counterpart 12 implements a 3 D effect such as a real thing.

Further, as illustrated in FIG. 2B, the eye height of the user 11, the center of the semi-transmissive reflector 3, the location of the camera 7, the center of the first reflector 3, and the center of the video monitor 5 are configured on one optical axis A and match the eye of the counterpart to obtain an effect of actually facing the counterpart across the table.

The present invention may be used by adding a lighting device 9 to left and right partitions 4 and 4*a* as illustrated in FIG. 3A, and a microphone 8 and a speaker 8*a* are added to appropriate locations, and a video communication device may be added to a part of the table 2 or the case 1 for video communication, and a video material or a lecture material is displayed in the video monitor 5 by a notebook computer or a table PC to perform a remote lecture.

Therefore, in the present invention, as illustrated in FIGS. 2A and 2B, a video configured by the wireless Internet through the camera 7 and the microphone 8 and a video of the counterpart 12 through the sound and video communication device 10 and a solution are delivered to the speaker 8*a*, and the video of the counterpart 12 is displayed on the video monitor 5 of the counterpart regardless of a distance and a location to the user 11 in the same path. That is, as illustrated in FIG. 2B, the video of the camera 7 of the user 11 is implemented in the video monitor 5 of the counterpart in the long range, and the counterpart 12 in the long range is displayed on the video monitor 5 of the user 11 by the counterpart camera 7.

Therefore, the configuration of the present invention is installed at the rear end of the case 1 within the limited height D of the table 2 to enable a maximum of screen size, and a large screen of 20 to 65" may display an upper shape of the table of the counterpart to be close to the real thing size.

Further, the first reflector 6 is provided on the front surface of the video monitor 5 as the upward square and a reflection surface structure of the semi-transmissive reflector 3 provided as the parallel square, i.e., the omnidirectional square and the configuration of the camera 87 on the rear surface of the semi-transmissive reflector 3 provide the standing image without a separate inversion device so that upper, lower, left, and right sides of the videos of the video monitor 5 and the camera 7 are the same as each other.

Figure 3B:
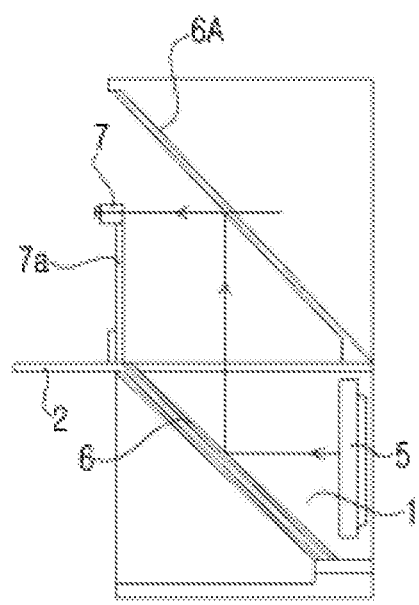
FIG. 3B is an explanatory diagram of an exemplary embodiment of the present invention.

In the present invention, as illustrated in FIG. 3B, the camera 7 is provided at the rear end of the table 2, and is replaced with a second reflector 6A that fully reflects the semi-transmissive reflector 3 on the rear surface, and provided.

That is, since the present invention is a structure in which the camera 7 is provided on the front surface of the second reflector 6A which fully reflects, brightnesses of the camera 7 and the video monitor 5 of which brightness is lowered by the semi-transmissive reflector 3 are fully reflected, so the brightness is increased up to twice.

As illustrated in FIG. 3B, the camera 7 may be combined with a left-right movement type or a variation device 7a that may vary the location of the camera 7 to move the location. For example, the camera is constituted by several pipes and when the camera 7 is used, the camera 7 is moved up to an eye height of the user 11 and when the camera 7 is not used, the camera 7 returns to an original location again. In this case, a visual field of the video monitor 5 is not hindered.

Therefore, the present invention may be carried out as below.

At a place having the present invention, video communication is enabled between nations, regions, long distances, buildings, and rooms through the video and sound communication device 10 such as the wireless Internet such as wifi, and variously usable for each usage.

Therefore, in the present invention, the real thing size of the counterpart is displayed in the video monitor of 20 to 65" and the sense of realism for the displayed counterpart video is increased within a space formed by the squares of the semi-transmissive reflector 3 an the first reflector 6 is increased, and a structure in which the camera 7 and the video camera 5 are configured in one optical axis A continuously matches the eye of the counterpart 12.

The upper, lower, left, and right sides of the video of the video monitor 5 and the video photographed by the camera 7 match each other by two square reflector structures to give a virtual face-to-face effect as if sitting on the table while confronting the counterpart 12 face to face.

Therefore, when the present invention is used in a restaurant or a cafe, the user may have a meal while taking a meal simultaneously with the counterpart at an appointed time in another city in a long range.

For example, in the restaurant with the present invention, the user may take a face-to-face meal when the time is determined in the restaurant with the present invention in another city in the long range.

Even though a doctor in a hospital does not visit a patient or the patient does not directly visit the hospital may receive a prescription through the virtual interview in a nearby cafe in which the present invention is installed.

Further, the same consultation effect for the consultation through a direct consultation with a client in another city in the long range may be obtained as a face-to-face consultation effect.

Further, a virtual guide in an information desk may be utilized as an effect such as the real thing.

When the present invention is constituted by plural numbers at the left and right sides, the present invention may be used for multiple persons, so a virtual face-to-face table device may be used at various places such as the restaurant, the cafe, the hospital, a school, a company, etc.

Further, even upon the consultation, the present invention may be used at various places requiring the virtual facing, such as performing a face-to-face conference with an office cafe in the nearby cafe with the present invention.

What is claimed:

1. A virtual face-to-face table device, comprising:
   a table provided in front of a user;
   a video monitor provided in a lower rear of the table and displaying a video of a counterpart;
   a first reflector provided for reflecting upward an image of the video monitor and provided at square 45° to reflect 90° upward;
   a second reflector provided at an upper part of the table totally reflecting the image at the first reflector 6 in a direction of the user.,
   a camera provided between the second reflector and the user,
   wherein a center of the video monitor, a center of the first reflector, a center of the second reflector, a center of the camera and a position of the user are located on a same optical-axis, wherein an image brightness of the video monitor reflected from the second reflector increases twice,
   wherein a function in which upper, lower, left, and right sides of the video of the video monitor and a photographed video of the camera become a same standing image, and a function of the table are combined.

* * * * *